US008365772B2

(12) United States Patent
Arikawa et al.

(10) Patent No.: US 8,365,772 B2
(45) Date of Patent: Feb. 5, 2013

(54) ACCUMULATOR

(75) Inventors: Tatsuhiro Arikawa, Kikukawa (JP); Takashi Ota, Kikukawa (JP); Eiji Mizutani, Kariya (JP); Noriyuki Hosoi, Kariya (JP)

(73) Assignees: Eagle Industry Co., Ltd. (JP); ADVICS Co., Ltd. (JP)

( * ) Notice: Subject to any disclaimer, the term of this patent is extended or adjusted under 35 U.S.C. 154(b) by 66 days.

(21) Appl. No.: 13/131,371

(22) PCT Filed: Nov. 19, 2009

(86) PCT No.: PCT/JP2009/069605
§ 371 (c)(1),
(2), (4) Date: May 26, 2011

(87) PCT Pub. No.: WO2010/061770
PCT Pub. Date: Jun. 3, 2010

(65) Prior Publication Data

US 2011/0226370 A1 Sep. 22, 2011

(30) Foreign Application Priority Data

Nov. 27, 2008 (JP) ................................ 2008-302347

(51) Int. Cl.
*F16L 55/04* (2006.01)

(52) U.S. Cl. ........................................... 138/30; 138/31

(58) Field of Classification Search .................... 138/30, 138/31
See application file for complete search history.

(56) References Cited

U.S. PATENT DOCUMENTS

| | | | | |
|---|---|---|---|---|
| 4,997,009 | A * | 3/1991 | Niikura et al. | 138/30 |
| 6,286,552 | B1 * | 9/2001 | Shimbori et al. | 138/31 |
| 6,810,915 | B2 * | 11/2004 | Umetsu et al. | 138/31 |
| 6,871,670 | B2 * | 3/2005 | Suzuki et al. | 138/30 |
| 7,325,571 | B2 * | 2/2008 | Shimbori et al. | 138/30 |
| 7,770,599 | B2 * | 8/2010 | Ota et al. | 138/31 |
| 2003/0116209 | A1 | 6/2003 | Umetsu et al. | |

FOREIGN PATENT DOCUMENTS

| | | | |
|---|---|---|---|
| EP | 1323928 | A1 | 7/2003 |
| JP | 2003-172301 | A | 6/2003 |
| JP | 2004-270763 | A | 9/2004 |

* cited by examiner

*Primary Examiner* — James Hook
(74) *Attorney, Agent, or Firm* — Harness, Dickey & Pierce, P.L.C.

(57) ABSTRACT

To cause a safety mechanism for an emergency to be activated at lower pressure in comparison with a rupture plate, an accumulator comprises an accumulator housing, a stay having a liquid passage provided in the end surface portion on an end of a stepped tubular portion of the stay, a bellows with a bellows cap, a safety mechanism for pressure drop, and a safety mechanism for an emergency which is structured such that, in an emergency such as a fire, the bellows cap or a member held by the bellows cap presses the stay by high pressure due to the fire in the housing, to buckle the stay at a step of the stepped tubular portion, and open a liquid chamber, wherein a thin portion is provided circumferentially partially at the step of the stay to readily incline the end surface portion of the stay when the stay is buckled.

1 Claim, 11 Drawing Sheets

ACCUMULATOR

CROSS-REFERENCE TO RELATED APPLICATIONS

This is a national stage of International Application No. PCT/JP2009/069605 filed on Nov. 19, 2009 and published in the Japanese language. This application claims the benefit of Japanese Application No. 2008-302347, filed on Nov. 27, 2008. The disclosures of the above applications are incorporated herein by reference.

BACKGROUND OF THE INVENTION

1. Field of the Invention

The present invention relates to an accumulator which is used as a pressure accumulating apparatus or a pulse pressure damping apparatus. The accumulator in accordance with the present invention is used, for example, for a hydraulic piping or the like in a vehicle such as a motor vehicle or the like.

2. Description of the Conventional Art

Conventionally, as shown in FIG. 11, there is known an accumulator 51 in which an internal space of an accumulator housing 52 provided with a gas sealing port 54 as well as being provided with an oil port 53 connected to a pressure piping (not shown) is comparted into a gas chamber 57 in which gas is charged, and a liquid chamber 58 which communicates with the oil port 53 by a bellows 55 with a bellows cap 56, and the bellows cap 56 moves and the bellows 55 expands and contracts to make gas pressure and liquid pressure balance, thereby the accumulator being actuated so as to accumulate pressure or actuated so as to damp pulse pressure (refer to Japanese Unexamined Patent Publication No. 2003-172301).

Further, the accumulator 51 is provided with a safety mechanism (a safety mechanism for a pressure drop time) 59 preventing the bellows 55 from being broken on the basis of unbalance between the gas pressure and the liquid pressure, at a time when pressure of the pressure piping is lowered, and pressure of the liquid chamber 58 is lowered. In other words, if the pressure of the pressure piping is extremely lowered by stopping of an operation of an equipment or otherwise, the liquid (oil) is discharged little by little from the oil port 53, the bellows 55 contracts little by little by the charged gas pressure in accordance with this, and a seal 60 provided on a lower surface of the bellows cap 56 comes into contact with a stay 61 so as to come to a so-called zero down state. The stay 61 is a single metal formed product in which a liquid passage 61*c* is provided in an end face portion 61*b* on the end of a tubular portion 61*a*. Further, in this zero down state, since a part of liquid is confined in the liquid chamber 58 by the seal 60, and the pressure of the confined liquid and the gas pressure of the gas chamber 57 balance, it is possible to inhibit the bellows 55 from being broken on the basis of application of excessive stress to the bellows 55.

Further, the accumulator 51 is provided with a safety mechanism (a safety mechanism for an emergency time) 62 preventing the liquid within the liquid chamber 58 and the gas within the gas chamber 57 from rapidly expanding so as to make the accumulator 51 explode, at an emergency time such as fire occurrence. In other words, if the liquid within the liquid chamber 58 and the gas within the gas chamber 57 are rapidly expanded due to the occurrence of a fire or the like, a rupture plate 61*d* provided circumferentially locally in a peripheral surface of the stay 61 is ruptured by this high pressure so that the high pressure is released therefrom, thereby inhibiting an internal portion of the accumulator 51 from becoming extremely high pressure so as to explode.

However, in the conventional art mentioned above, since the safety mechanism 62 for the emergency time is constructed by the rupture plate 61*d* provided circumferentially locally in the peripheral surface of the stay 61 as mentioned above, there is such a disadvantage that rupture pressure is high (such great pressure as to rupture the metal plate is necessary) and accordingly the safety mechanism 62 for the emergency time is not actuated until the pressure becomes extremely high pressure. Further, it can be thought to provide a fusible plug or a valve in place of the rupture plate 61*d*. However, the fusible plug is not actuated until the plug itself becomes high temperature, and the valve has such a risk that the valve may be erroneously opened (erroneously activated) at the other times than the emergency time on the basis of its mechanical structure.

SUMMARY OF THE INVENTION

Problem to be Solved by the Invention

The present invention is made by taking the points mentioned above into consideration, and an object of the present invention is to provide an accumulator provided with a safety mechanism for an emergency time which can be actuated at lower pressure than that of the case that a rupture plate is provided circumferentially locally in a periphery surface of a stay.

Means for Solving the Problem

In order to achieve the object mentioned above, in accordance with the present invention, there is provided an accumulator comprising:

an accumulator housing which is provided with an oil port connected to a pressure piping and is provided with a gas charging port in an end portion at an opposite side;

a stay which is arranged at an inner side of the oil port within the housing and is provided with a liquid passage in an end surface portion on an end of a stepped tubular portion;

a bellows which is arranged within the housing, is provided with a bellows cap on a floating end and comparts a space within the housing into a gas chamber being charged with gas and a liquid chamber communicating with the oil port;

a safety mechanism for a pressure drop time which confines a part of liquid in the liquid chamber on the basis of sealing between the bellows cap or a member retained by the bellows cap and the end surface portion of the stay at a time when pressure of the liquid chamber is lowered in accordance with a pressure drop of the pressure piping; and a safety mechanism for an emergency time which opens the liquid chamber on the basis of buckling of the stay due to a step of the stepped tubular portion by the bellows cap or the member retained by the bellows cap pressing the stay in response to housing internal pressure which becomes higher pressure at an emergency time such as fire occurrence or the like, wherein the step of the stay is provided circumferentially partially with a thin portion so that the end surface portion of the stay readily inclines at a time when the bellows cap presses the stay and the stay buckles due to the step at the emergency time.

In the accumulator in accordance with the present invention having the structure mentioned above, the stay is structured such that the liquid passage is provided in the end surface portion on the end of the stepped tubular portion, and the safety mechanism for the emergency time is structured such that the bellows cap or the member retained by the bellows cap presses the stay on the basis of the housing internal pressure becoming higher pressure at the emergency time such as fire occurrence or the like and the stay buckles due to the step, thereby the liquid chamber being opened. Accordingly, since the safety mechanism for the emergency time is actuated on the basis of the application of such pressure as to "buckle" the stay, the pressure not being high enough to "rupture" the stay, it is possible to provide the safety mechanism which can be actuated by lower pressure in comparison with the case of the rupture plate.

Further, since the step of the stay is provided with the circumferentially partial thin portion, the end surface portion of the stay inclines at a time when the stay buckles, and the liquid chamber can be more easily opened by the incline of the end surface portion of the stay.

Effect of the Invention

The present invention achieves the following effects.

According to the present invention, since the safety mechanism for the emergency time does not rupture the stay, but makes it buckle, it can be actuated at comparatively low pressure, and it is possible to enhance safety with regard to a rupture prevention of the accumulator accordingly. Further, since the step of the stay is provided circumferentially partially with the thin portion, the end surface portion of the stay inclines at a time when the stay buckles, and the liquid chamber is more easily opened on the basis of the incline of the end surface portion of the stay. Therefore, since the liquid chamber is easily opened at a time of the safety mechanism for the emergency time being actuated, it is possible to accurately actuate the safety mechanism.

BRIEF EXPLANATION OF DRAWINGS

FIGS. 2A and 2B are views showing singly a stay in the accumulator, in which FIG. 2A is a plan view of the same, and FIG. 2B is a sectional view of the same;

FIGS. 4A and 4B are views showing singly a stay in an accumulator in accordance with a second embodiment of the present invention, in which FIG. 4A is a plan view of the same, and FIG. 4B is a sectional view of the same;

FIGS. 5A and 5B are views showing singly a stay in an accumulator in accordance with a third embodiment of the present invention, in which FIG. 5A is a sectional view of the same, and FIG. 5B is a bottom view of the same;

FIGS. 10A and 10B are views showing singly a disc-shaped gasket in the accumulator, in which FIG. 10A is a plan view of the same and FIG. 10B is a sectional view of the same.

DETAILED DESCRIPTION OF THE PREFERRED EMBODIMENT

In this case, the following modes are included in the present invention.

In an accumulator structured such that an inner side of a cylindrical shell is comparted into two chambers by a metal bellows, gas is charged in an outer side of the bellows, and liquid flows in and out to an inner side of the bellows, one end opening of the expanding and contracting cylindrical bellows is fixed by welding to a shell, and the other end opening of the bellows is welded to a bellows cap so as to be closed. If the liquid flows out and the bellows contracts, a stay having a fluid outflow port and the bellows cap come into contact with each other. An annular seal is provided at a position surrounding a periphery of the fluid outflow port in order to prevent the bellows from being deformed in the case that liquid pressure is reduced widely in comparison with gas pressure, and the annular seal seals between the fluid outflow port and the bellows cap. The stay has a hollow cylindrical partition structure, has an upper flat surface side including the fluid outflow port and having a small diameter, is formed in a stepped shape, has a larger diameter toward the shell side, and has a thin portion formed circumferentially partially in a shoulder of the step portion. If it becomes high temperature or high pressure, while the annular seal engaged with or fixed to the bellows cap maintains the state of being in contact with the stay to surround and seal the fluid outflow port, and the bellows cap presses the stay, then the thin portion in the shoulder portion of the stay buckles and caves toward the shell side. Since the flat surface having the fluid outflow port inclines, or is compressed by the large-diameter cylindrical partition so as to be deformed, the sealing is broken, and the fluid having the high temperature and the high pressure is discharged to the outside of the accumulator. In accordance with the structure mentioned above, since a pressure receiving area can be secured larger than that of the rupture plate structure in accordance with the prior art, it is possible to discharge the fluid at the lower pressure. Further, since the fluid can be discharged by the lower pressure on the basis of the smaller buckling stress than the rupture stress, it is safe.

EMBODIMENT

Next, a description will be given of embodiments in accordance with the present invention with reference to the accompanying drawings.

First Embodiment

Figure 1:
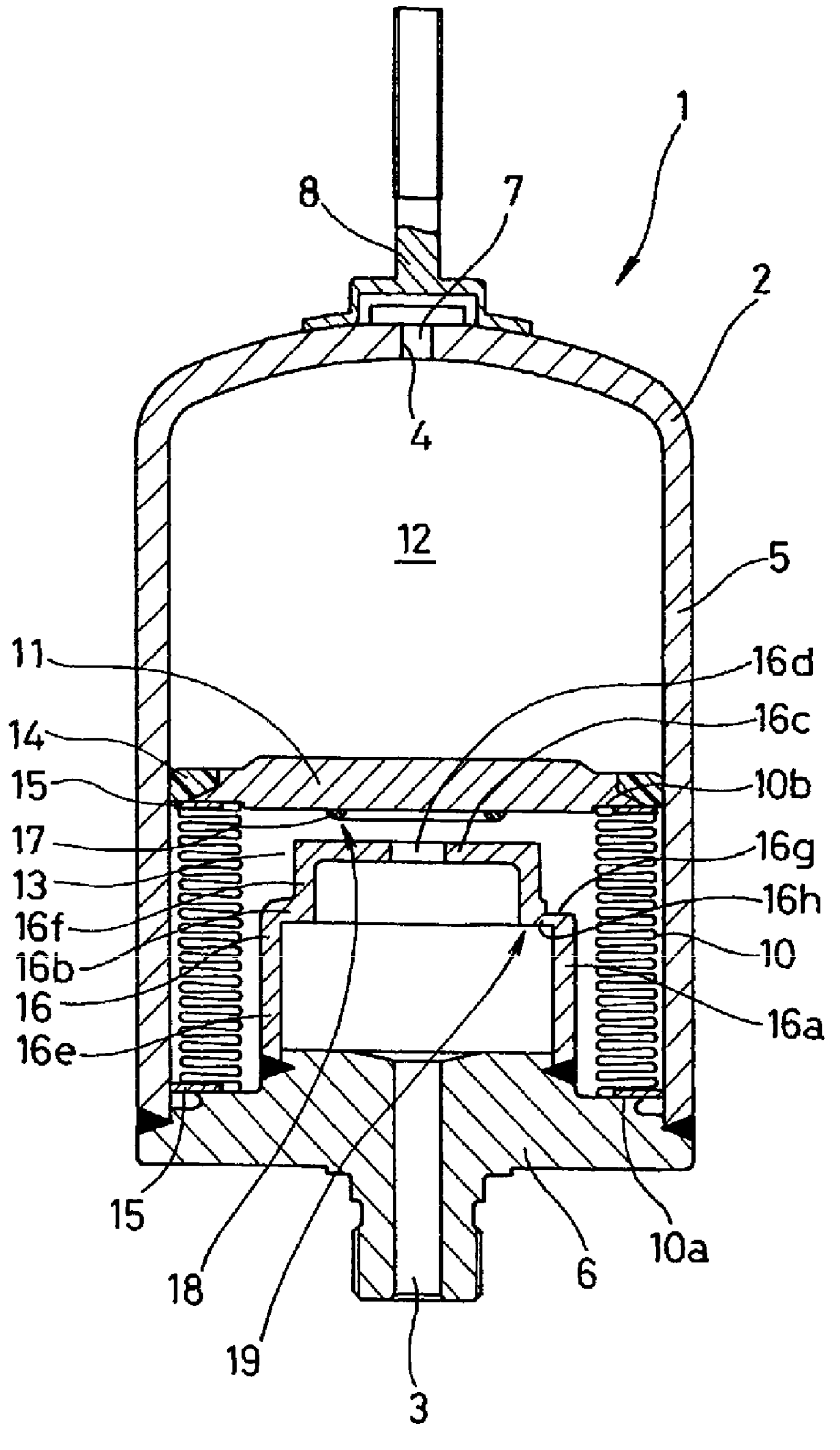
FIG. 1 is a sectional view of an accumulator in accordance with a first embodiment of the present invention.

FIG. 1 shows a section of an accumulator 1 in accordance with a first embodiment of the present invention. The accumulator 1 in accordance with the embodiment is a metal bellows type accumulator, in which a metal bellows is used as a bellows 10, and which is structured as follows.

An accumulator housing 2 provided with an oil port 3 connected to a pressure piping (not shown) in its one end (a lower end in the figure) and a gas charging port 4 in the other end (an upper end in the figure) is provided, the bellows 10 and a bellows cap 11 are arranged in an inner portion of the housing 2, and an internal space of the housing 2 is comparted into a gas chamber 12 being charged with high-pressure gas (for example, nitrogen gas), and a liquid chamber 13 communicating with the oil port 3. The illustrated housing 2 has a structure built by combination of a closed-end cylindrical shell 5, and an oil port member 6 fixed (welded) to one end opening portion of the shell 5. However, it is not particularly limited how the hosing 2 is built from components. For example, the oil port member 6 and the shell 5 may be integrated, or a bottom portion of the shell 5 may be constructed by an end cover which is independent from the shell 5. In any case, the gas charging port 4 for charging the gas into the gas chamber 12 is provided in the bottom portion of the shell 5 or a corresponding part thereto, and is closed by a gas plug 7 after charging the gas. Reference numeral 8 denotes a pin with hexagonal nut.

The bellows 10 is structured such that a fixed end 10*a* thereof is fixed (welded) to an inner surface of the oil port member 6 corresponding to an inner surface close to the oil port 3 of the housing 2, and the disc-shaped bellows cap 11 is fixed (welded) to a floating end 10*b* thereof, whereby the accumulator 1 is constructed as an outer gas type accumulator in which a gas chamber 12 is set at an outer peripheral side of the bellows 10 and a liquid chamber 13 is set at an inner peripheral side of the bellows 10. A vibration damping ring 14 is attached to an outer peripheral portion of the bellows cap 11 in order to prevent the bellows 10 and the bellows cap 11 from coming into contact with the inner surface of the housing 2. However, the vibration damping ring 14 does not achieve a sealing action. Reference numeral 15 denotes a protection ring.

A stay (an inner pedestal) 16 is arranged on an inner surface of the oil port member 6 corresponding to the inner surface close to the oil port 3 of the housing 2 at the inner peripheral side of the bellows 10, and the bellows 10 is arranged at an outer peripheral side of the stay 16.

The stay 16 is constructed by a single metal formed product (a sheet metal press product), is structured such that an end surface portion 16*c* is integrally formed on one end (an upper end in the figure) of a tubular portion 16*a* formed in a cylindrical shape with a step 16*b* toward an inner side in a radial direction, and is fixed (welded) to the inner surface of the oil port member 6 by the other end (a lower end in the figure) of the tubular portion 16*a*. A liquid passage 16*d* is provided in the center of the end surface portion 16*c* formed in a disc shape. Further, since the step 16*b* is formed in an annular shape and has a stepped sectional shape, the tubular portion 16*a* is divided into a large-diameter tubular portion 16*e* having a comparatively large diameter and a small-diameter tubular portion 16*f* having a comparatively small diameter by this step 16*b*, the former large-diameter tubular portion 16*e* is arranged at the oil port 3 side so as to be fixed to the oil port member 6, the latter small-diameter side tubular portion 16*f* is arranged at the bellows cap 11 side and the end surface portion 16*c* is integrally formed on an end portion thereof. The large-diameter tubular portion 16*e* and the small-diameter tubular portion 16*f* are arranged so as to be coaxial with each other.

Figure 2A:
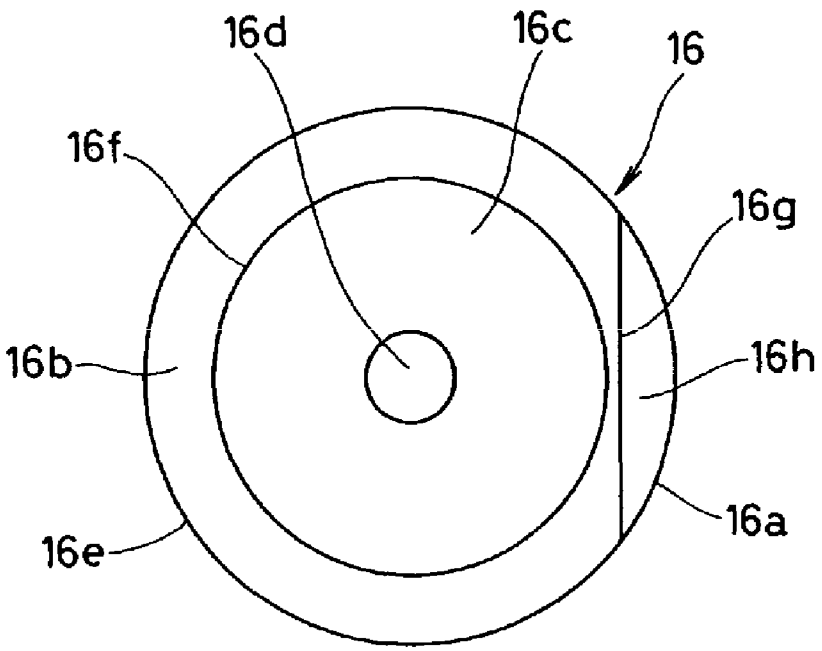
Figure 2B:
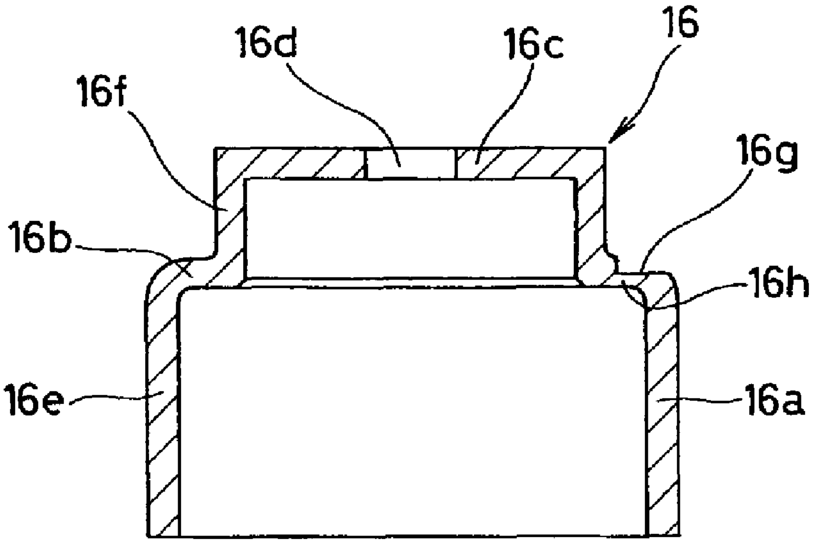
Figure 3:
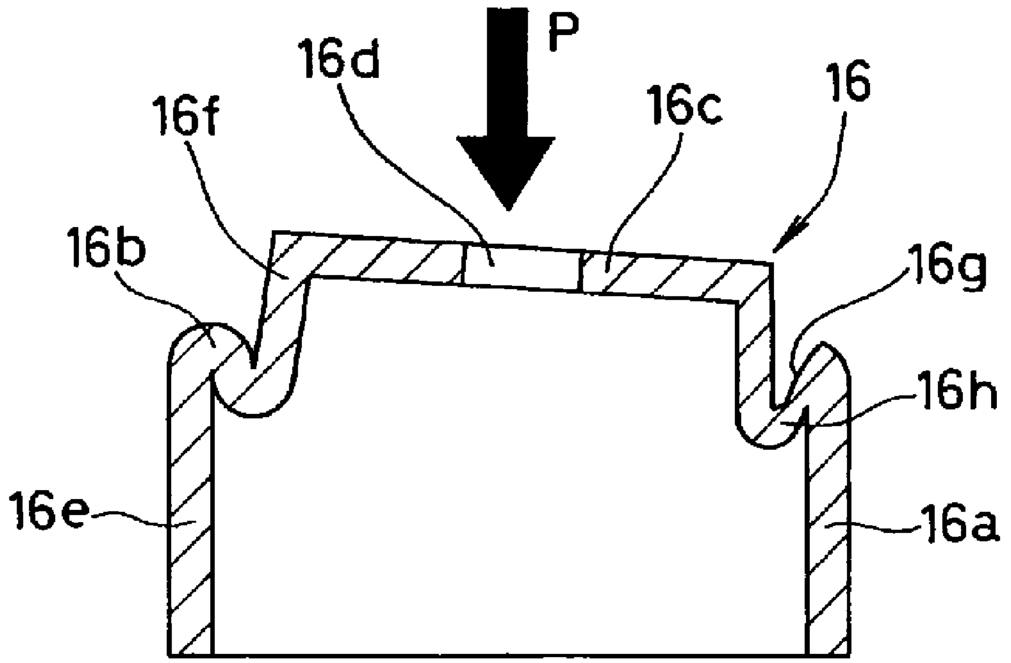
FIG. 3 is an explanatory view of the stay which buckles.

Further, the stay 16 is set to buckle at the step 16*b* at a time when high pressure P is applied from the bellows cap 11 side, so that the small-diameter side tubular portion 16*f* caves into an inner peripheral side of the large-diameter tubular portion 16*e*, as shown in FIG. 2 to FIG. 3.

Further, the stay 16 is provided circumferentially partially with a notch portion 16*g* in an outer surface of the step 16*b*, so that the end surface portion 16*c* readily inclines at a time of buckling at the step 16*b*, whereby the step 16*b* is provided circumferentially partially with thin portion 16*h*.

Turning back to FIG. 1, a seal portion 17 is attached to a surface close to the stay 16 of the bellows cap 11. If the bellows cap 11 moves in a direction coming close to the stay 16, the seal portion 17 comes into close contact with the end surface portion 16*c* of the stay 16, thereby sealing between the bellows cap 11 and the stay 16 so as to close the liquid passage 16*d*. The seal portion 17 is formed in an annular shape by an elastic body such as rubber or the like. However, it may be formed in a rubber membrane shape which is attached to the bellows cap 11. Further, the seal portion 17 may be structured such as to be attached to the end surface portion 16*c* of the stay 16, and come into close contact with the bellows cap 11 at a time when the bellows cap 11 moves in a direction of coming close to the stay 16 in this case, thereby sealing between the bellows cap 11 and the stay 16 so as to close the liquid passage 16*d*.

In any case, the combination of the bellows cap 11 having the seal portion 17 and the stay 16 constructs a safety mechanism 18 for a pressure drop time which closes the liquid passage 16*d* by sealing between the both 11 and 16, and thereby confines a part of liquid in the liquid chamber 13, at a time when the pressure in the pressure piping is lowered and the pressure in the liquid chamber 13 is lowered.

Further, the stay 16 which can buckle constructs a safety mechanism 19 for an emergency time, in which the bellows cap 11 presses the stay 16 on the basis of internal pressure of the housing 2 becoming high pressure at an emergency time such as a occurrence of a vehicle fire or the like and the stay 16 buckles thereby at the step 16*b*, so that the liquid chamber 13 is fully opened.

Next, a description will be given of an operation of the accumulator 1 having the structure mentioned above.

Stationary Operating Time

FIG. 1 shows a state of a stationary operating time of the accumulator 1. The oil port 3 is connected to a pressure piping of an equipment (not shown). In this stationary operating time, since the seal portion 17 provided on the bellows cap 11 is away from the end surface portion 16*c* of the stay 16, the liquid passage 16*d* provided in the end surface portion 16*c* of the stay 16 is open. Accordingly, since the oil port 3 communicates with the liquid chamber (the bellows inner peripheral space) 13 through the liquid passage 16*d*, and liquid with pressure at each time is freely introduced into the liquid chamber 13 from the oil port 3, the bellows cap 11 can freely move so as to make the liquid pressure and the charged gas pressure balance.

Pressure Drop Time (Zero Down Time)

If the pressure of the pressure piping is extremely lowered by a stop of the operation of the equipment from the state in FIG. 1, the liquid within the liquid chamber 13 is discharged little by little from the oil port 3, the bellows 10 is contracted by the charged gas pressure in accordance with this, and the bellows cap 11 moves in a contracting direction of the bellows 10, that is, a direction of coming close to the stay 16. If the bellows cap 11 comes close to the stay 16, the seal portion 17 comes into contact with the end surface portion 16*c* of the stay 16, and the liquid passage 16*d* is closed (a zero down state). Accordingly, since the liquid chamber (the bellows inner peripheral space) 13 is closed and a part of the liquid is confined in the liquid chamber 13, a further pressure drop of the liquid chamber 13 is not caused, whereby the liquid pressure and the charged gas pressure balance between an inner side and an outer side of the bellows 10. Therefore, any great pressure difference is not generated between the inner side and the outer side of the bellows 10, thereby preventing the bellows 10 from being broken. The action mentioned above means that the safety mechanism 18 for the pressure drop time constructed by the combination of the bellows cap 11 having the seal portion 17 and the stay 16 is actuated. If the zero down state is dissolved, the liquid is introduced newly from the oil port 3, and fluid pressure acts on the bellows cap 11. Therefore, the bellows cap 11 moves and the seal portion 17 is away from the stay 16.

Emergency Time Such as Fire Occurrence or the Like

If the accumulator 1 is fired by the occurrence of the vehicle fire or the like, the gas charged in the gas chamber 12 and the liquid introduced to the liquid chamber 13 are both expanded immediately. If the bellows cap 11 is in contact with the end surface portion 16*c* of the stay 16 by the seal portion 17 and the liquid passage 16*d* is kept closed at this time, the gas and the liquid can not be released, and the accumulator 1 is exploded. Accordingly, the safety mechanism 19 for the emergency time is actuated for preventing this. In other words, if the fire occurs and the accumulator 1 is fired in flames, the gas charged in the gas chamber 12 and the liquid introduced to the liquid chamber 13 are both expanded immediately and high pressure is generated. The bellows cap 11 presses the end surface portion 16*c* of the stay 16 by the seal portion 17 on the basis of this high pressure, and the stay 16 buckles and caves as shown in FIG. 3. As a result, the seal portion 17 is away from the end surface portion 16*c* of the stay 16 at least circumferentially partially. Accordingly, the liquid passage 16*d* is open, the high pressure is released, and thereby the explosion is prevented. The action mentioned above means that the safety mechanism 19 for the emergency time constructed by the stay 16 which can buckle is actuated.

In addition, with regard to the buckling of the stay 16, since the seal portion 17 is hard to be away from the end surface portion 16*c* in the case that the end surface portion 16*c* of the stay 16 which is initially a flat surface in parallel to the bellows cap 11 caves while keeping the position in parallel to the bellows cap 11, there is fear that the high pressure can not be sufficiently released. However, in the embodiment mentioned above, since the step 16*b* is provided circumferentially partially with the thin portion 16*h* as mentioned above, and the end surface portion 16*c* is thereby set to be easily inclined, the seal portion 17 is away from the end surface portion 16*c* at least circumferentially partially. Further, since the end surface portion 16*c* which is initially the flat surface is deformed by the buckling, it is thought that the seal portion 17 is away from the end surface portion 16*c* at least circumferentially partially. In order to make the stay 16 easily buckle, it is preferable to set an outer diameter of the small-diameter side tubular portion 16*f* smaller than an inner diameter of the large-diameter tubular portion 16*e*, and set such a dimensional difference large.

Second and Third Embodiments

Figure 4A:
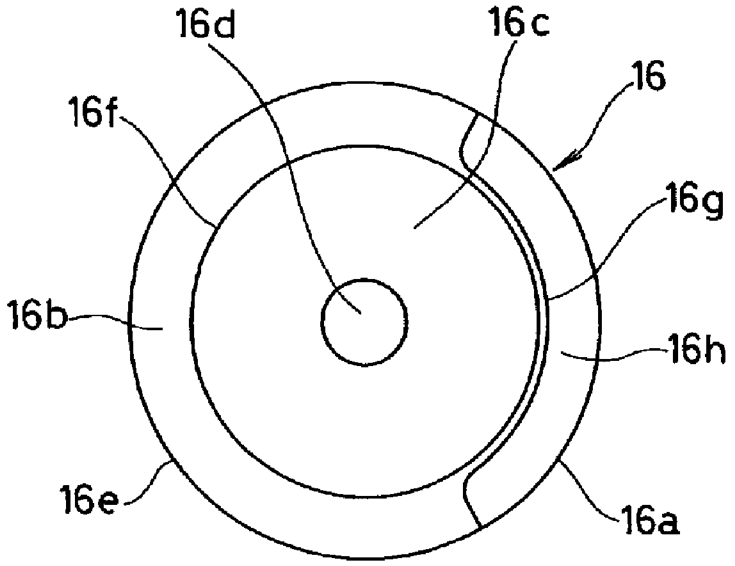
Figure 4B:
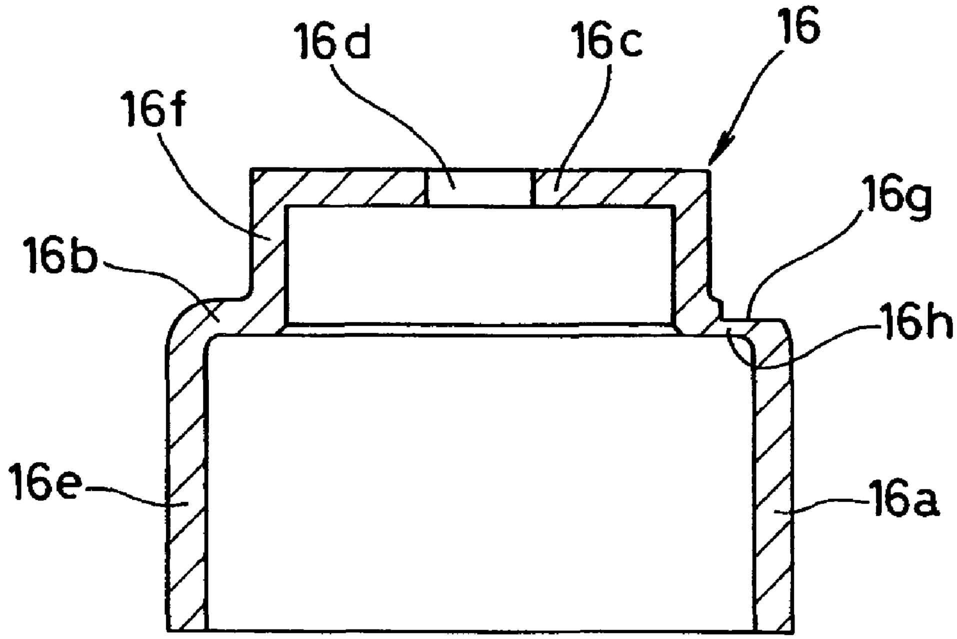
Figure 5A:
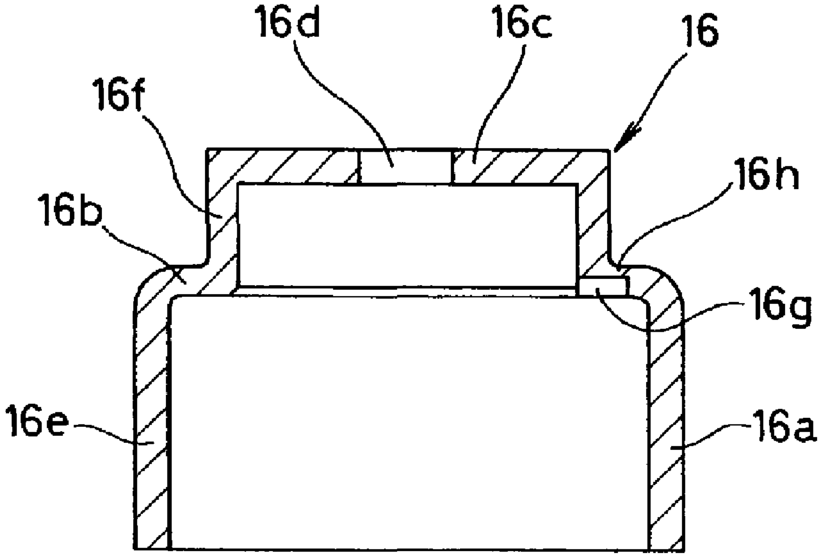
Figure 5B:
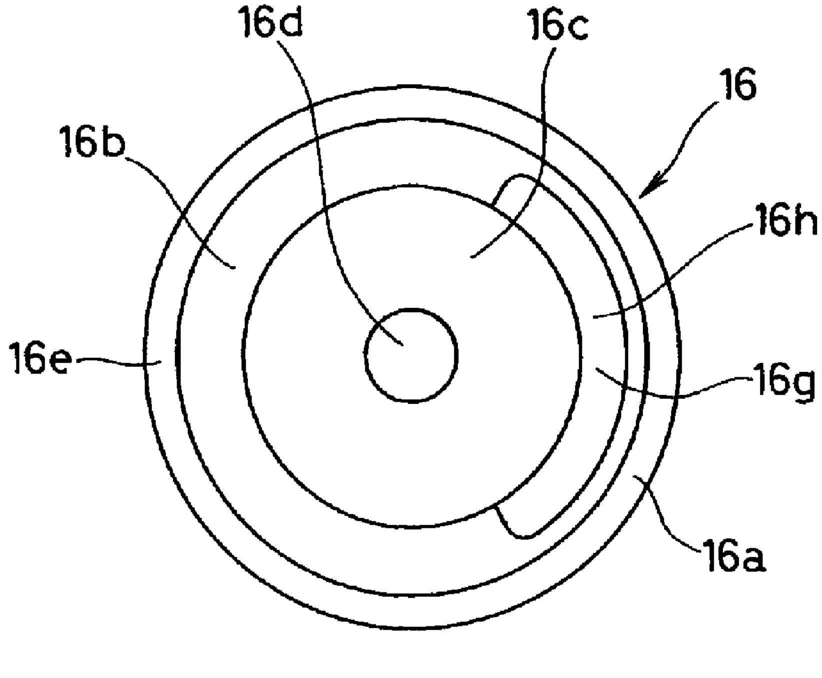

Further, in the embodiment mentioned above, the flat surface shape of the notch portion 16*g* for forming circumferentially partially the thin portion 16*h* is set to a bow shape as shown in FIG. 2A. However, it may be set to an arc shaped flat surface as shown in FIG. 4 as a second embodiment. Further, in the embodiment mentioned above, the notch portion 16*g* for forming the thin portion 16*h* circumferentially partially is provided in the outer surface (the upper surface) of the step 16*b*. However, it may be provided in the inner surface (the lower surface) of the step 16*b* as shown in FIG. 5 as a third embodiment, or may be provided in both of the outer surface (the upper surface) and the inner surface (the lower surface) of the step 16*b*.

Fourth Embodiment

Figure 6:
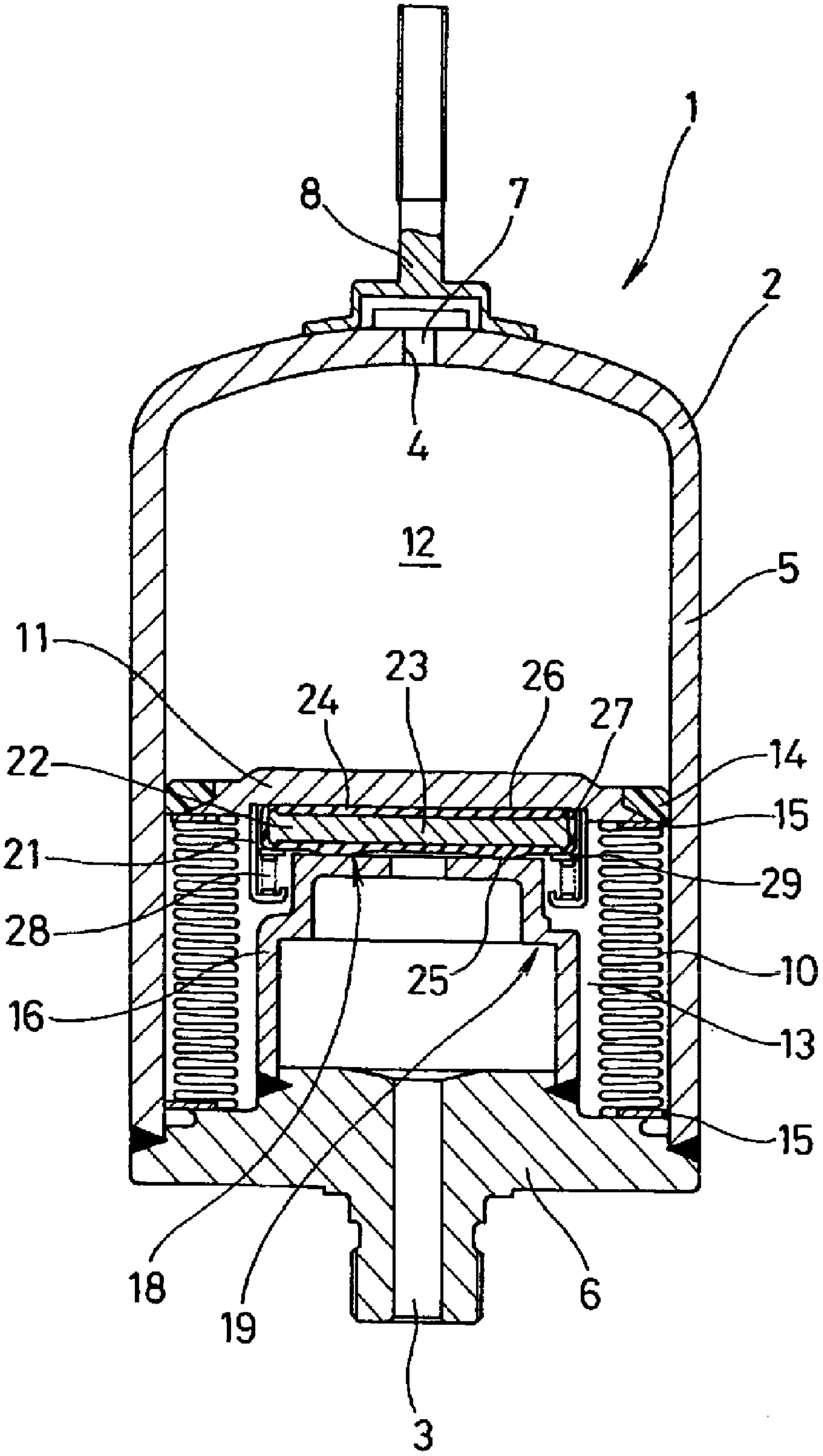
FIG. 6 is a sectional view of an accumulator in accordance with a fourth embodiment of the present invention.
Figure 7:
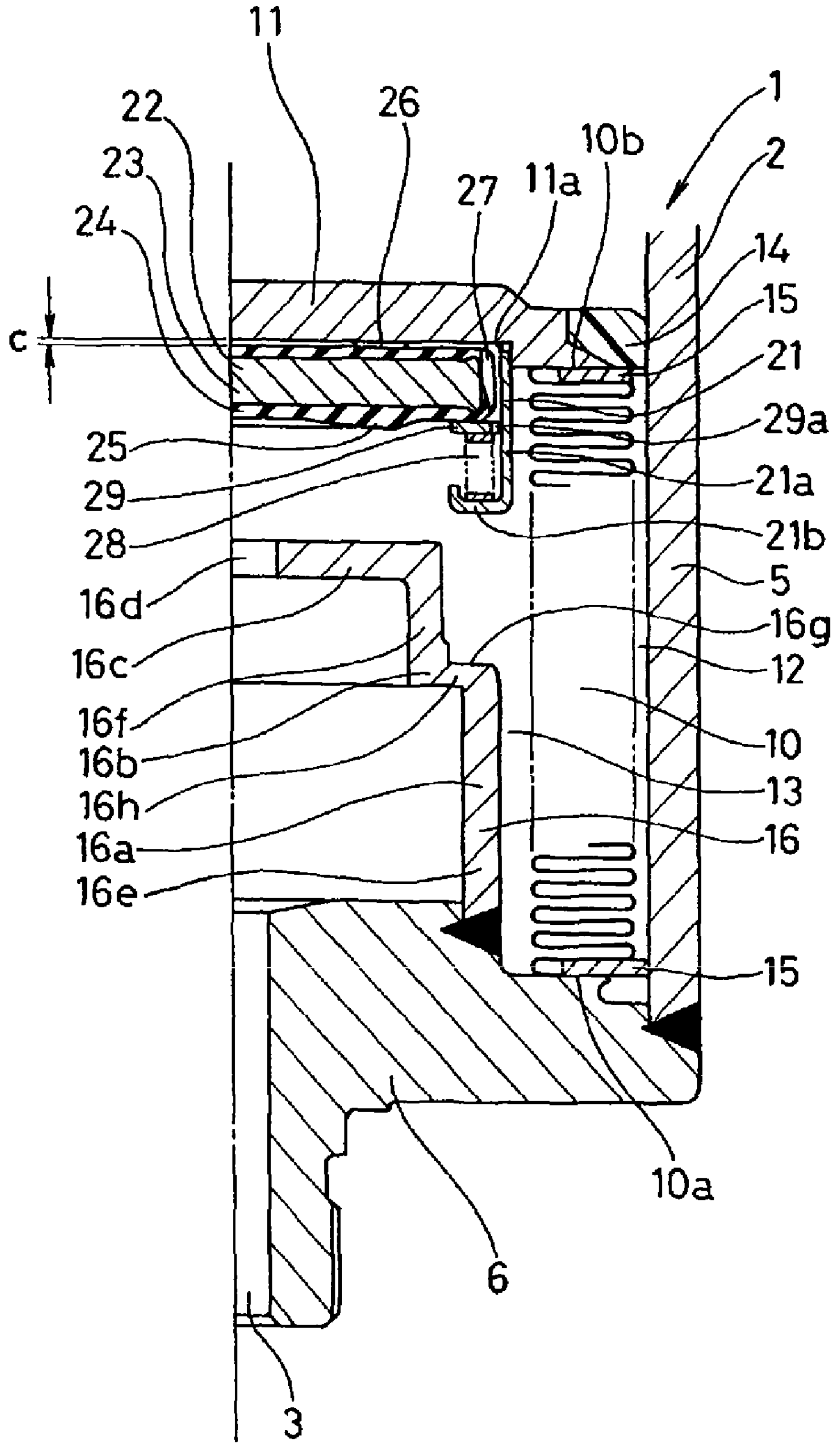
FIG. 7 is an enlarged sectional view of a substantial part and shows a state in which the accumulator is under a stationary operation.
Figure 8:
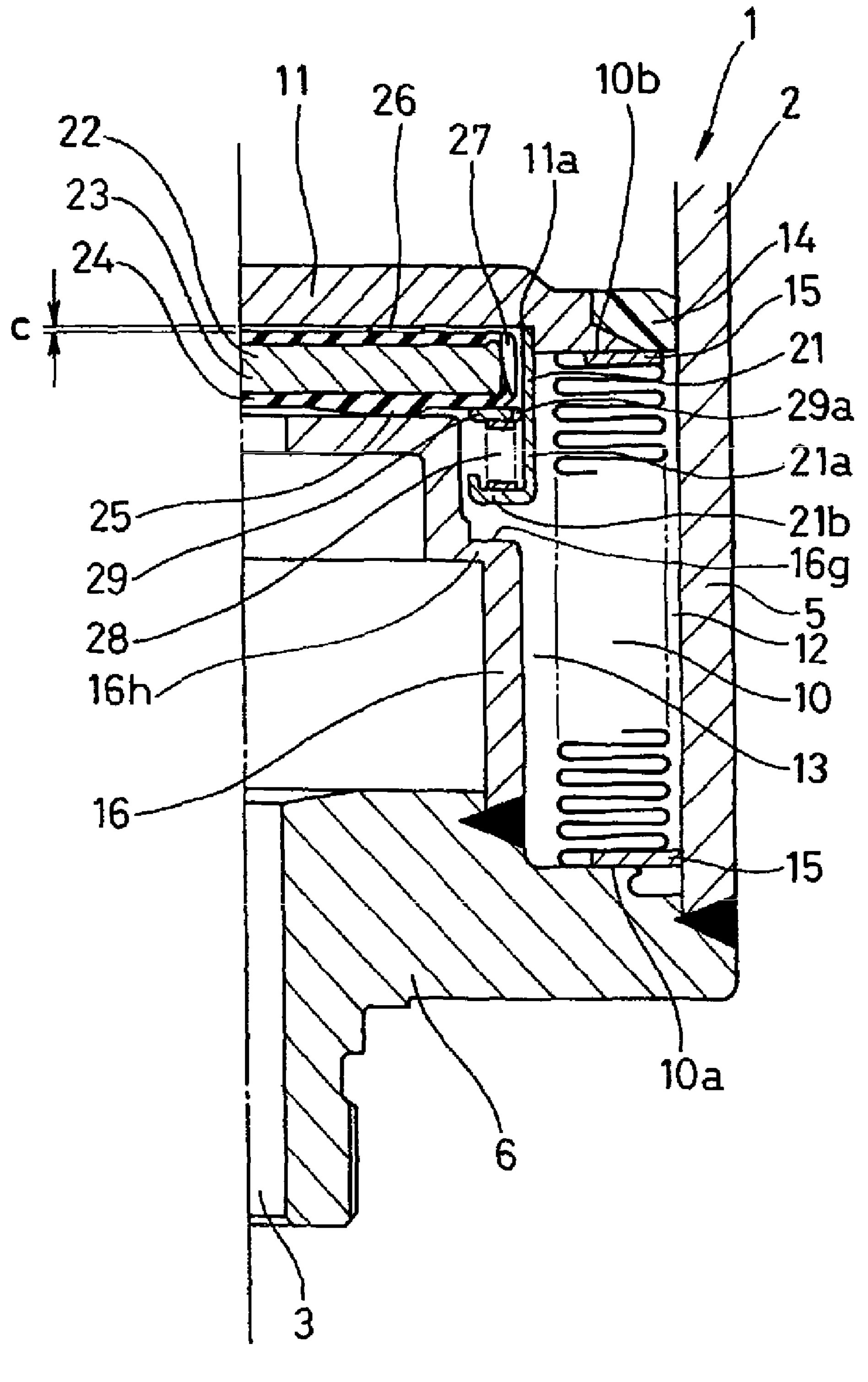
FIG. 8 is an enlarged sectional view of a substantial part and shows a state in which the accumulator is under a pressure drop.
Figure 9:
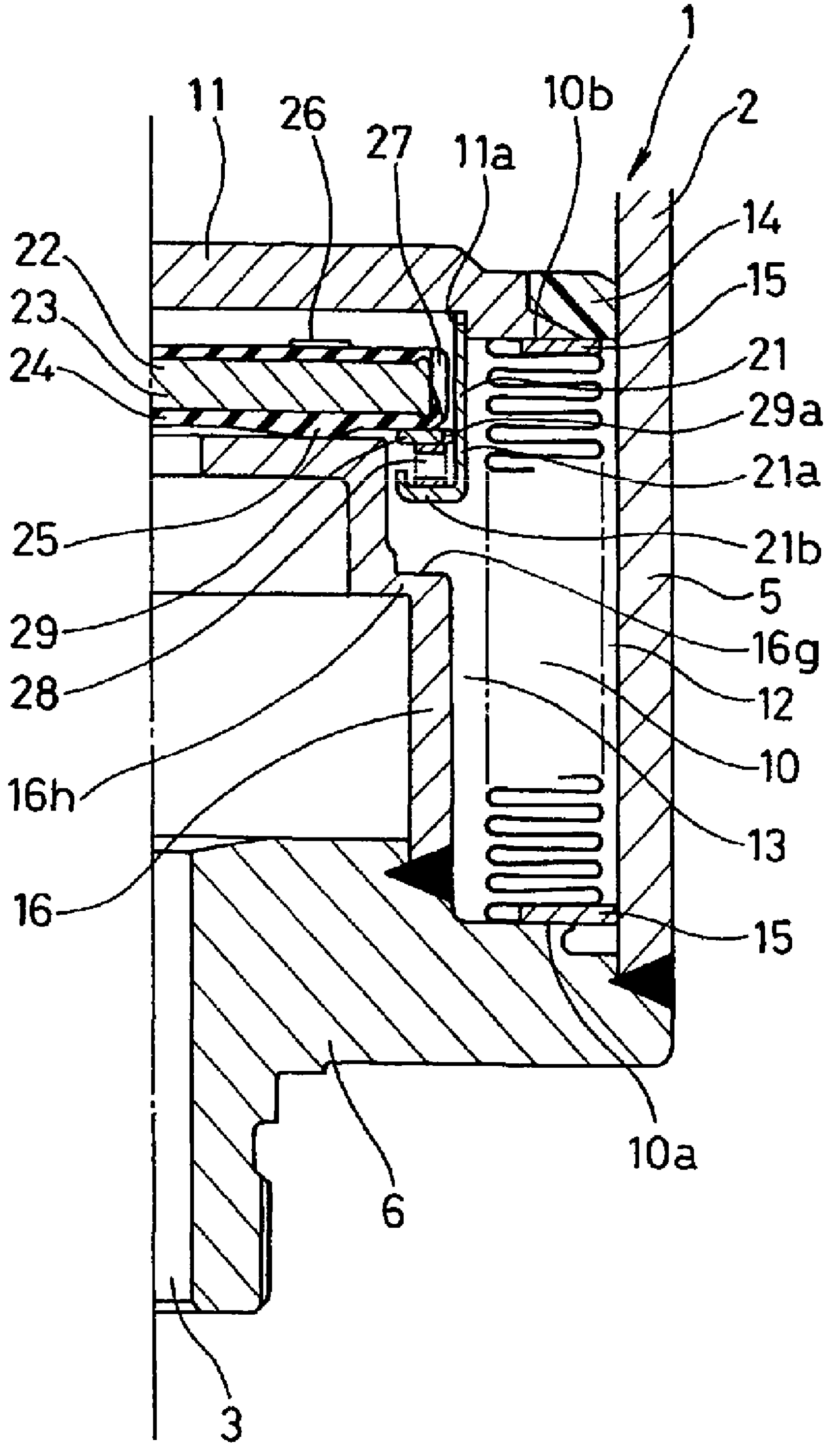
FIG. 9 is an enlarged sectional view of a substantial part and shows a state in which the accumulator is under a thermal expansion in the pressure drop state.
Figure 10A:
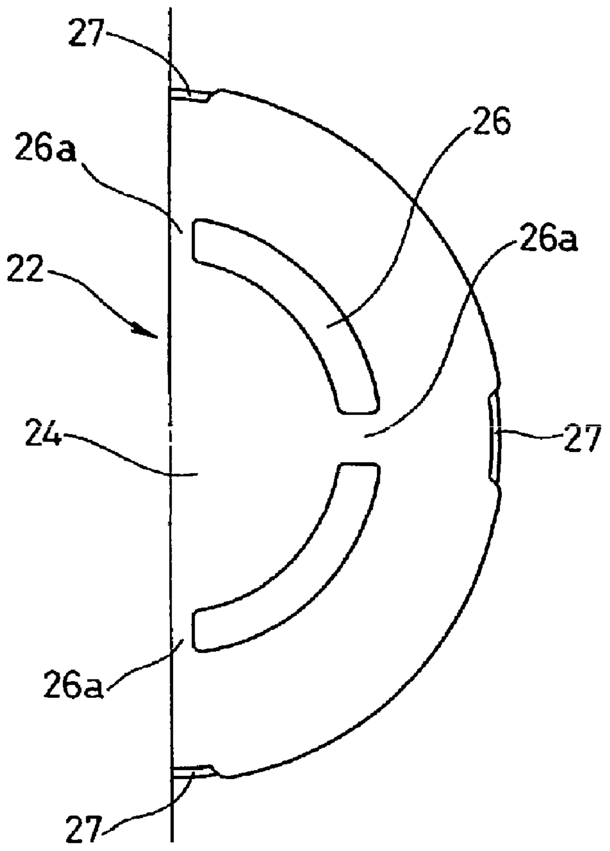
Figure 10B:
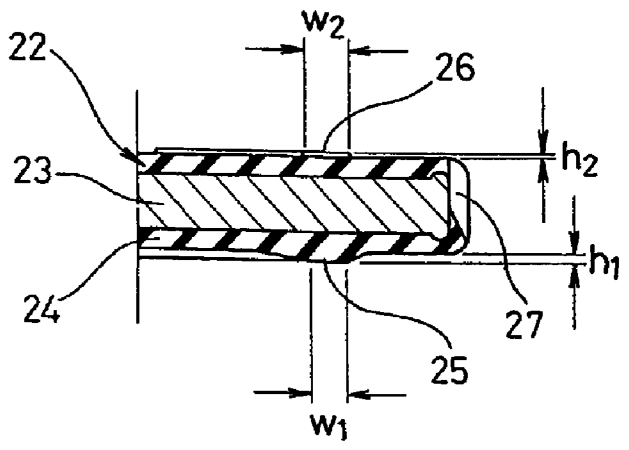
Figure 11:
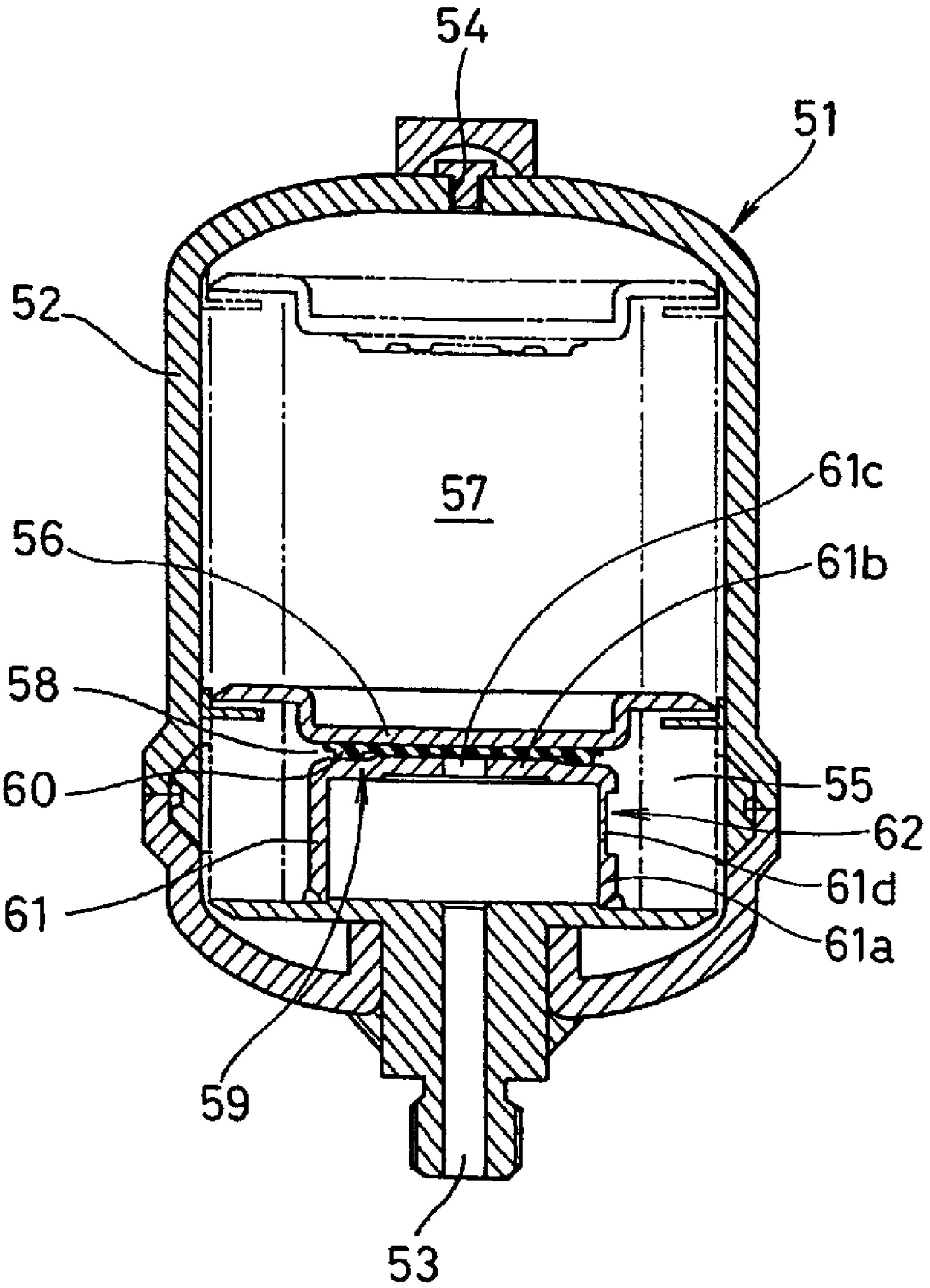
FIG. 11 is a sectional view of an accumulator in accordance with a prior art.

FIG. 6 shows a whole section of an accumulator 1 in accordance with a fourth embodiment of the present invention. FIGS. 7 to 9 show an enlarged section of a substantial part of the accumulator 1. FIG. 10 shows singly disc-shaped gasket 22. As for a state of operation in each of the figures, FIG. 7 shows a stationary operating time, FIGS. 6 and 8 show a pressure drop time (a zero down time), and FIG. 9 shows a state at a time of thermal expansion in a pressure drop state (a zero down state), respectively.

The accumulator 1 in accordance with the embodiment is a metal bellows type accumulator in which the metal bellows is used as the bellows 10, and which is constructed as follows.

An accumulator housing 2 provided with an oil port 3 connected to a pressure piping (not shown) in its one end (a lower end in the figure) and a gas charging port 4 in the other end (an upper end in the figure) is provided, and the bellows 10 and a bellows cap 11 are arranged in an inner portion of the housing 2 so that an internal space of the housing 2 is comparted into a gas chamber 12 being charged with high-pressure gas (for example, nitrogen gas), and a liquid chamber 13 communicating with the oil port 3. The illustrated housing 2 has a structure built by combination of a closed-end cylindrical shell 5, and an oil port member 6 fixed (welded) to one end opening portion of the shell 5. However, it is not particularly limited how the hosing 2 is built from components. For example, the oil port member 6 and the shell 5 may be integrated, or a bottom portion of the shell 5 may be constructed by an end cover which is independent from the shell 5. In any case, the gas charging port 4 for charging the gas into the gas chamber 12 is provided in the bottom portion of the shell 5 or a corresponding part thereto, and is closed by a gas plug 7 after charging the gas. Reference numeral 8 denotes a pin with hexagonal nut.

As shown in FIG. 7 in an enlarged manner, the bellows 10 is structured such that a fixed end 10*a* thereof is fixed (welded) to an inner surface of the oil port member 6 corresponding to an inner surface close to the oil port 3 of the housing 2, and the disc-shaped bellows cap 11 is fixed (welded) to a floating end 10*b* thereof, whereby the accumulator 1 is constructed as an outer gas type accumulator in which a gas chamber 12 is set at an outer peripheral side of the bellows 10 and a liquid chamber 13 is arranged at an inner peripheral side of the bellows 10. A vibration damping ring 14 is attached to an outer peripheral portion of the bellows cap 11 in order to prevent the bellows 10 and the bellows cap 11 from coming into contact with the inner surface of the housing 2. However, the vibration damping ring 14 does not achieve a sealing action. Reference numeral 15 denotes a protection ring.

A stay (an inner pedestal) 16 is arranged on an inner surface of the oil port member 6 corresponding to the inner surface close to the oil port 3 of the housing 2 at the inner peripheral side of the bellows 10, and the bellows 10 is arranged at an outer peripheral side of the stay 16.

The stay 16 is constructed by a single metal formed product (a sheet metal press product), is structured such that an end surface portion 16*c* is integrally formed on one end (an upper end in the figure) of a tubular portion 16*a* formed in a cylindrical shape with a step 16*b* toward an inner side in a radial direction, and is fixed (welded) to the inner surface of the oil port member 6 by the other end (a lower end in the figure) of the tubular portion 16*a*. A liquid passage 16*d* is provided in the center of the end surface portion 16*c* formed in a disc shape. Further, since the step 16*b* is formed in an annular shape and has a stepped sectional shape, the tubular portion 16*a* is divided into a large-diameter tubular portion 16*e* having a comparatively large diameter and a small-diameter tubular portion 16*f* having a comparatively small diameter by this step 16*b*, the former large-diameter tubular portion 16*e* is arranged at the oil port 3 side so as to be fixed to the oil port member 6, the latter small-diameter side tubular portion **16*f* is arranged at the bellows cap 11 side and the end surface portion 16*c* is integrally formed on an end portion thereof. The large-diameter tubular portion 16*e* and the small-diameter tubular portion 16*f*** are arranged so as to be coaxial with each other.

Further, the stay 16 is set to buckle at the step **16*b* at a time when high pressure P is applied from the bellows cap 11 side, so that the small-diameter side tubular portion 16*f* caves into an inner peripheral side of the large-diameter tubular portion 16*e*, as shown in FIG. 2 to FIG. 3** in accordance with the first embodiment mentioned above.

Further, the stay 16 is provided circumferentially partially with notch portion **16*g* in an outer surface of the step 16*b*, so that the end surface portion 16*c* readily inclines at a time of buckling at the step 16*b*, whereby the step 16*b* is provided circumferentially partially with thin portion 16*h***.

Turning back to FIG. 7, a gasket holder 21 is fixed to a surface close to the stay 16 of the bellows cap 11. The gasket holder 21 is constructed by integrally forming of a flange portion **21*b* on one end (a lower end in the figure) of a tubular portion 21*a* thereof toward an inner side in a radial direction, and is fixed (fitted) to a peripheral edge portion of the concave portion 11*a* provided in the surface close to the stay 16 of the bellows cap 11 by the other end (an upper end in the figure) of the tubular portion 21*a***.

A disc-shaped gasket 22 is retained to an inner peripheral side of the gasket holder 21 in a floatable state. In this case, being retained in the floatable state means that the disc-shaped gasket 22 is retained in a state of being movable in an axial direction (an expanding and contracting direction of the bellows 10) with respect to the gasket holder 21 and the bellows cap 11 to which it is fixed. Since the disc-shaped gasket 22 engages with the flange portion **21*b* of the gasket holder 21 so as to be prevented from coming off, it can move in the axial direction between the flange portion 21*b* and the bellows cap 11**.

Further, the disc-shaped gasket 22 is structured, as shown in FIG. 10, such that an elastic body 24 made of rubber or the like is attached to a surface of a disc-shaped rigid plate 23 made of a metal, a rigid resin or the like, a seal portion 25 which comes into contact with the end surface portion **16*c* of the stay 16 in a manner of freely moving close thereto and apart therefrom, and thereby closes the liquid chamber (the bellows inner peripheral space) 13, is formed on a surface close to the stay 16 of the gasket 22 by the elastic body 24 attached to the surface, and a spacer portion 26 which comes into contact with the bellow cap 11 in a manner of moving close thereto and apart therefrom, and thereby sets an axial gap c between the gasket 22 and the bellows cap 11, is formed on a surface close to the bellows cap 11 by the elastic body 24. The gap c is set between the gasket 22 and the bellows cap 11 by the latter spacer portion 26, for making the liquid easily enter into the portion between the gasket 22 and the bellows cap 11 at a time when the liquid thermally expands at the zero down time (If the spacer portion 26 is not provided, the gasket 22 and the bellows cap 11 come to a closely attached state at the zero down time, and in such the state, the liquid is hard to enter into the portion between both the elements 11 and 22 at a time of thermal expansion of the liquid. Accordingly, such an action that only the bellows cap 11 moves in a state in which the gasket 22 keeps coming into contact with the end surface portion 16*c* of the stay 16 is hard to be caused). A desired number of notch portions 27 are provided in an outer peripheral portion of the gasket 22 so that the liquid easily passes through the portion between the gasket 22 and the gasket holder 21**.

Since the seal portion 25 is formed as an annular projection having predetermined height h1 and radial width w1, and because of an annular shape, it achieves a sealing action at a time of coming into contact with the end surface portion **16*c* of the stay 16 so as to close the liquid chamber (the bellows inner peripheral space) 13. On the other hand, the spacer portion 26 is formed as an annular projection having predetermined height h2 and radial width w2. However, since a desired number of notch portions 26*a* are provided circumferentially partially, and thereby the spacer portion 26 does not have an annular shape, it does not achieve a sealing action even if it comes into contact with the bellows cap 11. Therefore, a pressure receiving area of the surface close to the bellows cap 11 in the disc-shaped gasket 22 is set larger than a pressure receiving area of the surface close to the stay 16, in a state in which the disc-shaped gasket 22 comes into contact with the end surface portion 16*c* of the stay 16 by the seal portion 25** thereof.

Further, a wave spring 28 is interposed as a spring means for elastically energizing the disc-shaped gasket 22 in a direction of being pressed to the bellows cap 11, between the flange portion **21*b* of the gasket holder 21 and the disc-shaped gasket 22. Reference numeral 29 denotes a spring plate (a washer), and a desired number of notches 29*a* are provided in an outer peripheral portion thereof so that the liquid can easily pass through the portion between the spring plate 29 and the gasket holder 21**.

The combination of the disc-shaped gasket 22 having the seal portion 25 and the stay 16 constructs a safety mechanism 18 for a pressure drop time which closes the liquid passage **16*d* by sealing between the both 16 and 22, and thereby confines a part of the liquid in the liquid chamber 13 at a time when the pressure in the pressure piping is lowered and the pressure in the liquid chamber 13** is lowered.

Further, the stay 16 which can buckle constructs a safety mechanism 19 for an emergency time, in which the disc-shaped gasket 22 presses the stay 16 on the basis of an internal pressure of the housing 2 becoming high pressure at an emergency time such as a occurrence of a vehicle fire or the like and the stay 16 buckles thereby at the step **16*b*, so that the liquid chamber 13** is fully opened.

Next, a description will be given of an operation of the accumulator 1 having the structure mentioned above.

Stationary Operating Time

FIG. 7 shows a state of a stationary operating time of the accumulator 1 as mentioned above. The oil port 3 is connected to a pressure piping of an equipment (not shown). In this stationary operating time, since the disc-shaped gasket 22 moves together with the bellows cap 11 in a state of being retained to the gasket holder 21, thereby being away from the end surface portion **16*c* of the stay 16, the liquid passage 16*d* provided in the end surface portion 16*c* of the stay 16 is open. Accordingly, since the oil port 3 communicates with the liquid chamber (the bellows inner peripheral space) 13 through the liquid passage 16*d*, and the liquid with pressure at each time is freely introduced into the liquid chamber 13 from the oil port 3, the bellows cap 11 can freely move together with the disc-shaped gasket 22** so as to make the liquid pressure and the charged gas pressure balance.

Pressure Drop Time (Zero Down Time)

If the pressure of the pressure piping is extremely lowered by a stop or the like of the operation of the equipment from the state in FIG. 7, the liquid within the liquid chamber 13 is discharged little by little from the oil port 3, the bellows 10 is contracted by the charged gas pressure in accordance with this, and the bellows cap 11 moves in a contracting direction of the bellows 10, that is, a direction of coming close to the stay 16, as shown in FIGS. 6 and 8. Since the disc-shaped gasket 22 is retained on the surface close to the stay 16 of the bellows cap 11, the disc-shaped gasket 22 comes into contact with the end surface portion 16*c* of the stay 16 by the seal portion 25, and the liquid passage 16*d* is closed (a zero down state). Accordingly, since the liquid chamber (the bellows inner peripheral space) 13 is closed and a part of the liquid is confined in the liquid chamber 13, a further pressure drop of the liquid chamber 13 is not caused, whereby the liquid pressure and the charged gas pressure balance between an inner side and an outer side of the bellows 10. Therefore, any great pressure difference is not generated between the inner side and the outer side of the bellows 10, thereby preventing the bellows 10 from being broken. The action mentioned above means that the safety mechanism 18 for the pressure drop time constructed by the combination of the disc-shaped gasket 22 having the seal portion 25 and the stay 16 is actuated.

Thermal Expansion Time in Pressure Drop State (Zero Down State)

If the liquid confined in the liquid chamber 13 and the charged gas are thermally expanded by a rise of temperature of an ambient atmosphere or otherwise, in the pressure drop state (the zero down state) shown in FIGS. 6 and 8, that is, the state in which the disc-shaped gasket 22 comes into contact with the end surface portion 16*c* of the stay 16 and the liquid chamber (the bellows inner peripheral space) 13 is closed, a pressure difference is generated since a degree of pressure rise is greater in the liquid than in the charged gas. Accordingly, as shown in FIG. 9, the bellows cap 11 moves, while compressing the wave spring 28, to a position where the liquid pressure and the charged gas pressure balance, on the basis of the application of the pressure difference. Therefore, since the liquid pressure and the charged gas pressure are always in the balanced state, the pressure difference is not generated between the inner side and the outer side of the bellows 10, thereby preventing the bellows 10 from being abnormally deformed (plastically deformed). In addition, at the thermal expansion time, the disc-shaped gasket 22 does not move while keeping contacting with the end surface portion 16*c* of the stay 16 due to the difference of the pressure receiving areas in both the surfaces. Therefore, the liquid passage 16*d* is kept closed.

Emergency Time Such as Fire Occurrence or the Like

If the accumulator 1 is fired by the occurrence of the vehicle fire or the like, the gas charged in the gas chamber 12 and the liquid introduced to the liquid chamber 13 are both expanded immediately. If the disc-shaped gasket 22 is in contact with the end surface portion 16*c* of the stay 16 by the seal portion 25 and the liquid passage 16*d* is kept closed at this time, the gas and the liquid can not be released, and the accumulator 1 is exploded. Accordingly, the safety mechanism 19 for the emergency time is actuated for preventing this. In other words, if the fire occurs and the accumulator 1 is fired in flames, the gas charged in the gas chamber 12 and the liquid introduced to the liquid chamber 13 are both expanded immediately and high pressure is generated. The bellows cap 11 and the disc-shaped gasket 22 press the end surface portion 16*c* of the stay 16 by the seal portion 25 on the basis of this high pressure, and the stay 16 buckles and caves as shown in FIG. 3 in accordance with the first embodiment. As a result, the seal portion 25 is away from the end surface portion 16*c* of the stay 16 at least circumferentially partially. Accordingly, the liquid passage 16*d* is open, the high pressure is released, and thereby the explosion is prevented. The action mentioned above means that the safety mechanism 19 for the emergency time constructed by the stay 16 which can buckle is actuated.

In addition, with regard to the buckling of the stay 16 since the seal portion 25 is hard to be away from the end surface portion 16*c* in the case that the end surface portion 16*c* of the stay 16 which is initially a flat surface in parallel to the disc-shaped gasket 22 caves while keeping the position in parallel to the disc-shaped gasket 22, there is fear that the high pressure can not be sufficiently released. However, in the embodiment mentioned above, since the step 16*b* is provided circumferentially partially with the thin portion 16*h* as mentioned above, and the end surface portion 16*c* is thereby set to be easily inclined, the seal portion 25 is away from the end surface portion 16*c* at least circumferentially partially. Further, since the end surface portion 16*c* which is initially the flat surface is deformed by the buckling, it is thought that the seal portion 25 is away from the end surface portion 16*c* at least circumferentially partially. In order to make the stay 16 easily buckle, it is preferable to set an outer diameter of the small-diameter side tubular portion 16*f* smaller than an inner diameter of the large-diameter tubular portion 16*e*, and set such a dimensional difference large.

Further, in each of the embodiments, the description is given of the case that the present invention is applied to the outer gas type accumulator. However, the present invention can be applied to an inner gas type accumulator. In the inner gas type accumulator, the bellows is fixed to the inner surface of the gas charging port side of the housing by its fixed end, and the liquid chamber is set at the outer peripheral side of the bellows while the gas chamber is set at the inner peripheral side of the bellows.

What is claimed is:

1. An accumulator comprising:

an accumulator housing which is provided with an oil port connected to a pressure piping and is provided with a gas charging port in an end portion at an opposite side;

a stay which is arranged at an inner side of said oil port within said housing and is provided with a liquid passage in an end surface portion on an end of a stepped tubular portion;

a bellows which is arranged within said housing, is provided with a bellows cap on a floating end and comparts a space within said housing into a gas chamber being charged with a gas and a liquid chamber communicating with said oil port;

a safety mechanism for a pressure drop time which confines a part of liquid in said liquid chamber on the basis of sealing between said bellows cap or a member retained by said bellows cap and the end surface portion of said stay at a time when pressure of said liquid chamber is lowered in accordance with a pressure drop of said pressure piping; and a safety mechanism for an emergency time which opens said liquid chamber on the basis of buckling of said stay due to a step of said stepped tubular portion by said bellows cap or the member retained by said bellows cap pressing said stay in response to housing internal pressure which becomes higher pressure at an emergency time such as a fire occurrence or the like, wherein the step of said stay is provided circumferentially partially with a thin portion so that the end surface portion of said stay readily inclines at a time when said bellows cap presses said stay and said stay buckles due to said step at said emergency time.

* * * * *